(12) United States Patent
West et al.

(10) Patent No.: US 9,971,213 B2
(45) Date of Patent: May 15, 2018

(54) FREQUENCY-CONTROLLED ELECTRO-OPTICAL DEVICE

(71) Applicants: John Lawton West, Hartville, OH (US); Da-Wei Lee, Pittsburgh, PA (US); Merrill Groom, Kent, OH (US)

(72) Inventors: John Lawton West, Hartville, OH (US); Da-Wei Lee, Pittsburgh, PA (US); Merrill Groom, Kent, OH (US)

(73) Assignee: Kent State University, Kent, OH (US)

( * ) Notice: Subject to any disclaimer, the term of this patent is extended or adjusted under 35 U.S.C. 154(b) by 18 days.

(21) Appl. No.: 15/180,677

(22) Filed: Jun. 13, 2016

(65) Prior Publication Data

US 2016/0363799 A1    Dec. 15, 2016

Related U.S. Application Data

(60) Provisional application No. 62/174,891, filed on Jun. 12, 2015.

(51) Int. Cl.
*G02F 1/1343* (2006.01)
*G02F 1/133* (2006.01)
(Continued)

(52) U.S. Cl.
CPC ........ *G02F 1/13439* (2013.01); *G02F 1/1334* (2013.01); *G02F 1/13306* (2013.01);
(Continued)

(58) Field of Classification Search
CPC .......... G02F 1/13; G02F 1/133; G02F 1/1334; G02F 1/134309; G02F 1/134336; G02F 1/136286; G02F 1/133345; G02F 1/13306; G02F 1/1335; G02F 1/133707; G02F 1/1333; G02F 1/133362; G02F 1/134363; G02F 1/13476; G02F 1/133305;
(Continued)

(56) References Cited

U.S. PATENT DOCUMENTS 3,947,183 A    3/1976 Haas et al.
5,105,185 A *  4/1992 Nakanowatari ......... G02F 1/135
                                                      345/208

(Continued)

FOREIGN PATENT DOCUMENTS

WO    WO2015038067 A1    3/2015

*Primary Examiner* — Thoi Duong
(74) *Attorney, Agent, or Firm* — Renner, Kenner, Greive, Bobak, Taylor & Weber Co. LPA

(57) ABSTRACT

A frequency controlled electro-optical device includes a substrate having transparent conductive control sections patterned thereon to selectively control the optical state of an electro-optical layer. Each of the control sections are partially electrically isolated from each other by crack lines, which allows for electrical communication between adjacent/proximate control sections to occur. As such, an electrical control signal applied directly to one control section forms an electric field in that control section, and also induces an electrical field in adjacent control sections that are not in direct receipt of the control signal. Therefore, the number of electrical connections required for coupling to a driving circuit to operate the device is minimized, thereby allowing the device to be fabricated with reduced complexity and cost.

24 Claims, 12 Drawing Sheets

(51) Int. Cl.
  *G02F 1/1334* (2006.01)
  *G02F 1/153* (2006.01)
  *G02F 1/155* (2006.01)
  *G02F 1/163* (2006.01)
  *G02F 1/17* (2006.01)
  *G02F 1/1333* (2006.01)
  *G09G 3/36* (2006.01)

(52) U.S. Cl.
  CPC ........ *G02F 1/134309* (2013.01); *G02F 1/153* (2013.01); *G02F 1/155* (2013.01); *G02F 1/163* (2013.01); *G02F 1/172* (2013.01); *G02F 1/133305* (2013.01); *G09G 3/36* (2013.01); *G09G 2300/0426* (2013.01)

(58) Field of Classification Search
  CPC .......... G02F 1/153; G02F 1/155; G02F 1/163; G02F 2001/1676; G02F 1/15; H01L 23/5387; H01L 51/0097; G02B 6/0083; G02B 26/02; G09G 2300/0426; G09G 2300/0876; G09G 3/36; G09G 3/3655; G09G 3/3696
  USPC .......... 359/315, 295, 237, 245, 292; 345/87, 345/212, 204, 211, 84; 257/59, 72, 9, 257/E21.476; 349/139, 33, 150, 193, 86, 349/158, 16, 201, 202
  See application file for complete search history.

(56) References Cited

U.S. PATENT DOCUMENTS

| | | | |
|---|---|---|---|
| 6,879,424 B2* | 4/2005 | Vincent | C09K 9/02 252/586 |
| 2008/0055831 A1 | 3/2008 | Satoh | |
| 2012/0307337 A1 | 12/2012 | Bartug et al. | |
| 2013/0186925 A1 | 7/2013 | West et al. | |
| 2013/0258711 A1* | 10/2013 | Okuyama | G02B 6/0055 362/611 |
| 2014/0098007 A1 | 4/2014 | Delpier et al. | |

* cited by examiner

FREQUENCY-CONTROLLED ELECTRO-OPTICAL DEVICE

CROSS-REFERENCE TO RELATED APPLICATION

This application claims the benefit of U.S. Provisional Application No. 62/174,891 filed on Jun. 12, 2015, the contents of which are incorporated herein by reference.

TECHNICAL FIELD

Generally, embodiments of the present invention relate to electro-optical devices. Particularly, embodiments of the present invention relate to a frequency-controlled electro-optical device, which utilizes a plurality of conductive patterned transparent control sections, whereby each control section is electrically isolated from neighboring control sections by crack lines. More particularly, embodiments of the present invention relate to an electro-optical device having a direct control section in direct receipt of an AC (alternating current) control signal, which is able to control, based on the frequency of the control signal, the number of indirect control sections proximately arranged relative to the direct control section, so as to adjust the size of an electro-responsive layer in which an optical state is controlled.

BACKGROUND

Flat panel devices, such as flat-panel displays, including LCD (liquid crystal) displays, and polymer dispersed liquid crystal devices (PDLC) utilize transparent, conductive electrodes to control various operating functions of the flat panel device. For example, during the fabrication of a typical flat panel device, the transparent, conductive electrodes are typically formed of a thin, transparent, electrically-conductive film material, such as indium-tin-oxide (ITO), which is vacuum-deposited on a transparent, rigid glass substrate. Next, the ITO film is patterned into optically-transparent electrodes using conventional photolithographic techniques. Such a process requires precise and accurate bonding of the electrodes to the driving circuitry of the display, which can be costly.

Recently however, the flat-panel device industry has sought to replace the use of rigid glass substrates with flexible substrates, such as those formed from flexible plastics and polymers, while still retaining the use of ITO, or other electrically-conductive polymers, to form the transparent electrodes.

Specifically, when ITO is patterned using standard lithographic techniques, individual ITO stripes/strips are formed, such that there is no electrical connection or communication between neighboring, adjacent ITO stripes/strips. In other words, when standard lithographic techniques are used to pattern the ITO film into a plurality of ITO stripes/strips, each ITO stripe/stripe is electrically isolated from neighboring, adjacent ITO stripes. Due to this electrical isolation, or lack of electrical connection between neighboring, adjacent ITO stripes/strips, a driving signal, such as a voltage signal, is applied to an electrode that is directly attached to one of conductive ITO stripes/strips is only able to affect or control the ITO stripe/strip to which the electrode is directly connected. Thus, the image driven by an applied voltage can only be switched in those areas of the flat panel device that are covered by the ITO stripe/strip in direct receipt of the driving signal. In other words, the image driven by the voltage applied to the ITO stripe/strip is limited to the region defined by the dimension of the directly driven ITO stripe/strip itself.

Therefore, there is a need for an electro-optical device having a plurality of conductive transparent sections (i.e. stripes/strips) that are patterned on a substrate, such as a flexible substrate, so as to be separated from each other by cracks, whereby each control section (or portion thereof) is in partial electrical communication with neighboring, adjacent control sections. In addition, there is a need for an electro-optical device having an electro-optical responsive layer disposed next to the plurality of control sections, such that the optical state of an area of the electro-optical responsive layer is controlled by both the control sections that are in direct receipt of a control signal (i.e. direct control sections) and simultaneously, by one or more control sections that neighbor or that are adjacent to the directly driven ITO sections (i.e. indirect control sections) that do not directly receive a control signal. Furthermore, there is a need for an electro-optical device having an electro-optical responsive layer disposed adjacent to the plurality of control sections, such that the number of indirect control sections that are activated to deliver an electric field by any given direct control section is adjusted by the frequency of the control signal that is directly applied to the corresponding direct control sections, and as a result, the size of an area of the electro-optical responsive layer in which the optical state is controlled by the direct and indirect control sections is adjusted.

SUMMARY

In one embodiment, an electro-optical device includes a plurality of control sections formed of electrically conductive, at least partially light transparent material, wherein each one of said plurality of control sections is electrically isolated from another control section by a pair of adjacent crack lines, wherein one or more of said plurality of control sections comprises a direct control section adapted to directly receive a control signal, and wherein one or more of said plurality of control sections adjacent to said direct control section comprises an indirect control section; and an electro-optical responsive layer positioned adjacent to said plurality of control sections; wherein when the control signal is received by said one or more direct control sections, an electric field is generated in said one or more direct control sections and in said one or more indirect control sections, whereby an optical state of an area of said electro-optical responsive layer that is exposed to the electric field is controlled.

In another embodiment, a method of controlling an electro-optical device includes providing an electro-optical device having a plurality of control sections formed of electrically conductive, at least partially light transparent material, wherein each one of said plurality of control sections is electrically isolated from another control section by a pair of adjacent crack lines, wherein one or more of said plurality of control sections comprises a direct control section adapted to directly receive a control signal, and wherein one or more of said plurality of control sections adjacent to said direct control section comprises an indirect control section, and wherein an electro-optical responsive layer is positioned adjacent to said plurality of control sections; applying an alternating current (AC) control signal to each said direct control section; generating an electric field in said direct control section and in at least one of said indirect control sections; and controlling an optical state of an area of said electro-responsive material that is exposed to said electric field.

In still another embodiment, an electro-optical device includes a plurality of control sections formed of electrically conductive, at least partially light transparent material, wherein each one of said plurality of control sections is electrically isolated from another control section by one or more crack lines, wherein one or more of said plurality of control sections comprises a direct control section adapted to directly receive a control signal, and wherein one or more of said plurality of control sections adjacent to said direct control section comprises an indirect control section; and an electro-optical responsive layer positioned adjacent to said plurality of control sections; wherein when the control signal is received by said one or more direct control sections, an electric field is generated in said one or more direct control sections and in said one or more indirect control sections, whereby an optical state of an area of said electro-optical responsive layer that is exposed to the electric field is controlled.

It is another aspect of the present invention to provide a patterned conductive material on a substrate, e.g. cracked ITO stripes/sections on a PET substrate, having conductive material on another substrate, e.g. continuous ITO plane on PET substrate, having a display material disposed between the two substrates, e.g. polymer dispersed liquid crystal, having a driving system, which provides a minimum number of electrodes (i.e. a number less than the number of ITO stripes), connecting the electrodes from the driving system with the patterned conductive material and the another conductive material mentioned above, wherein different frequencies of voltages are applied from the driving system to the patterned conductive material and the another conductive material through the electrodes, resulting in the display of an image, which is controlled by the frequency of the applied voltage.

It is still another aspect of one or more embodiments to provide two patterned conductive materials on two substrates, e.g. cracked ITO stripes on a PET substrate, having a display material or touch sense material disposed between the two substrates, e.g. cholesteric liquid crystal or insulator, having a driving system which provides a minimum number of electrodes (i.e. a number less than the number of ITO stripes), connecting the electrodes from the driving system with the patterned conductive materials mentioned above, different frequencies of voltages are applied from the driving system to the patterned conductive materials, resulting in an image or a touch sense which is controlled by the frequency of the applied voltage.

BRIEF DESCRIPTION OF THE DRAWINGS

These and other features and advantages of the present invention will become better understood with regard to the following description, appended claims, and accompanying drawings wherein:

DETAILED DESCRIPTION

Figure 1:
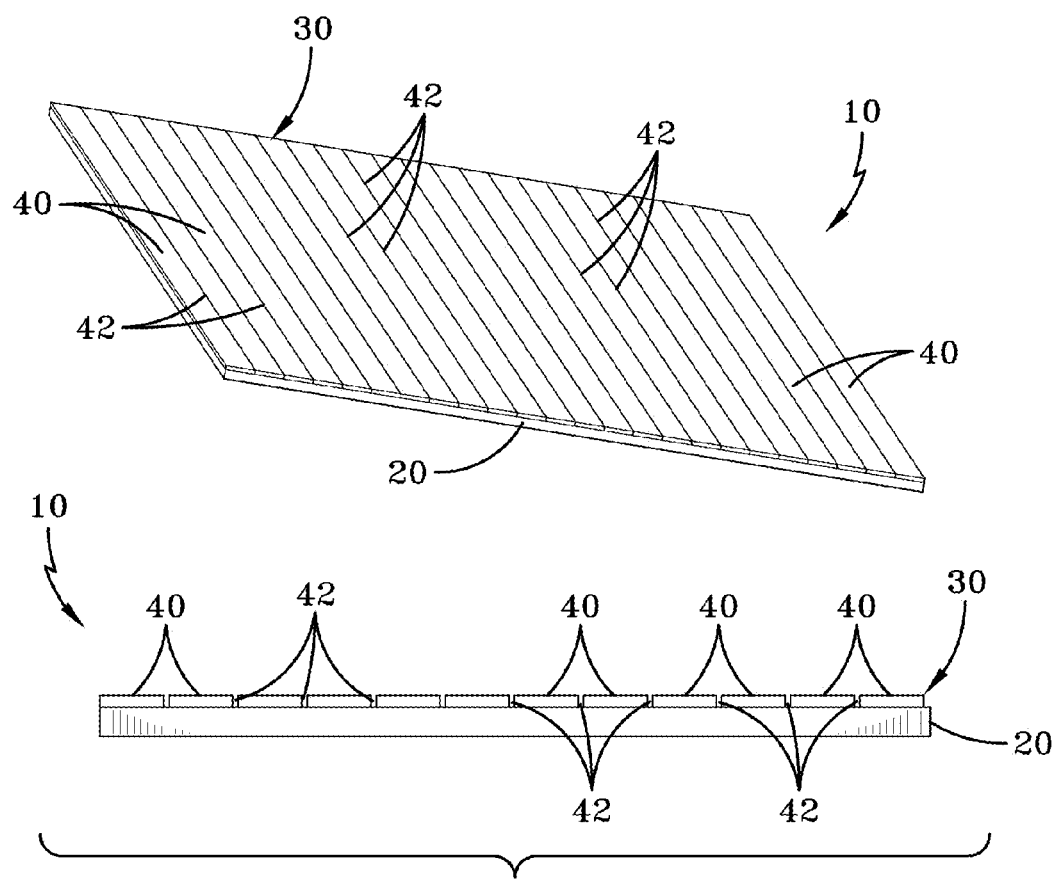
FIG. 1 is a perspective view of a frequency controlled electro-optical device having transparent conductive control sections disposed adjacent to a substrate in accordance with the concepts of the present invention.

An embodiment of the present invention, as shown in FIG. 1, provides a frequency-controlled electro-optical device 10, which includes any device that utilizes liquid crystal material and composites thereof for controlling the transition of the device between light transparent and light opaque states. For example, the electo-optical device 10 may include, but is not limited to, liquid crystal based devices, such as liquid crystal display devices, polymer dispersed liquid crystal devices, bistable cholesteric devices, quest host shutters, and the like. The device 10 includes a substrate 20, formed of a rigid material, a flexible material, or a composite of both. In some embodiments, the substrate 20 comprises a transparent or partially transparent material. In addition, in some embodiments, the substrate 20 may comprise any suitable flexible polymeric or plastic material, such as PET (polyethylene terephthalate), polycarbonate material, polyimide material, and the like. In other embodiments, the substrate 20 may comprise a film, such as a thin film or any other suitable flexible substrate is shown in FIG. 1 of the drawings.

Positioned adjacent to the substrate 20 is a transparent conductive layer 30. However, in other embodiments, the transparent conductive layer 30 may be separated from the substrate 20 by one or more other intervening layers of various other materials, such as a thin silicon oxide film for example. The transparent conductive layer 30 comprises any suitable at least partially light transparent material that is also electrically conductive, including ITO (indium-tin-oxide) for example. The transparent conductive layer 30 is patterned into electrodes formed as stripes, strips, or sections, herein referred to as control sections 40, by utilizing any suitable process for forming cracks in the layer 30, including a "cracking" process in accordance with that set forth in International Application No. PCT/US14/72751, entitled "Method of Patterning Electrically-Conductive Film on a Flexible Substrate", which is incorporated herein by reference; and U.S. application Ser. No. 13/721,312, entitled "Method of Patterning Electrically-Conductive Film on Flexible Substrates", which is also incorporated herein by reference. That is, each individual control section 40 is separated from other directly adjacent sections 40 by a pair of spaced crack lines 42, as shown in FIG. 1. As such, a pair of directly adjacent or consecutively crack lines 42 serves to define individual sections 40 therebetween. It should be appreciated that while the control sections 40 are shown in the Figs. as elongated segments, the control sections 40 may be formed to have any suitable shape and associated width and length dimensions, so long as each control section 40 is entirely separated/isolated from every other control section 40 by one or more individual or continuous crack lines 42. That is, in other embodiments of the device 10, the control sections 40 may take on any desired shape or design. It should also be appreciated that the crack lines 42 themselves may be configured to be rectilinear, curvilinear, or a combination thereof. For example, in some embodiments of the device 10, the crack lines 42 and sections 40 may be substantially parallel with each other, while still providing a level of electrical coupling with other control sections 40 adjacent or proximate thereto. Thus, the crack lines 42 are configured as cracks or fractures in the transparent conductive layer 30, which due to their nature creates a high electrical resistance, which functions as a dielectric, and that partially electrically separates or isolates each of the individual sections 40 from each other. As such, the crack lines 42 serve to provide partial electrical electrical isolation of each section 40 from other section(s) 40, while allowing an electrical field directly applied to one control section (i.e. direct control section) 40A via the control signal to be induced in other control sections 40B that are adjacent to direct control sections 40A, but that are not in direct receipt of a control signal (i.e. indirect control section). As such, the electrical isolation provided by the crack lines 42 still enables adjacent control sections 40 to electrically communicate to a degree or level that is determined by the frequency of the control signal used. It should be appreciated that the term "adjacent" as used herein to define the positional relationship between the direct 40A and indirect 40B control sections, includes positions in which the control sections 40A and 40B are next to each other, directly next to each other, as well as proximate or near to each other.

Figure 2:
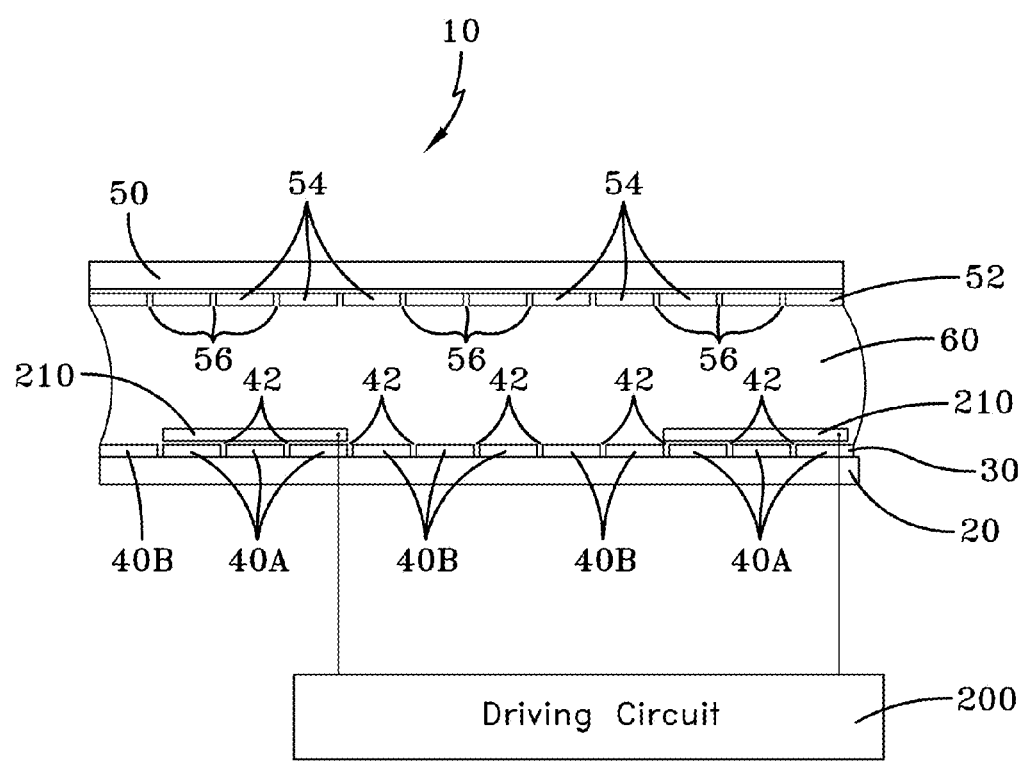
FIG. 2 is a perspective view of the frequency controlled electro-optical device having a plurality of direct control sections directly coupled to a driving circuit, and a plurality of indirect control sections positioned adjacent to the direct control section in accordance with the concepts of the present invention.
Figure 3:
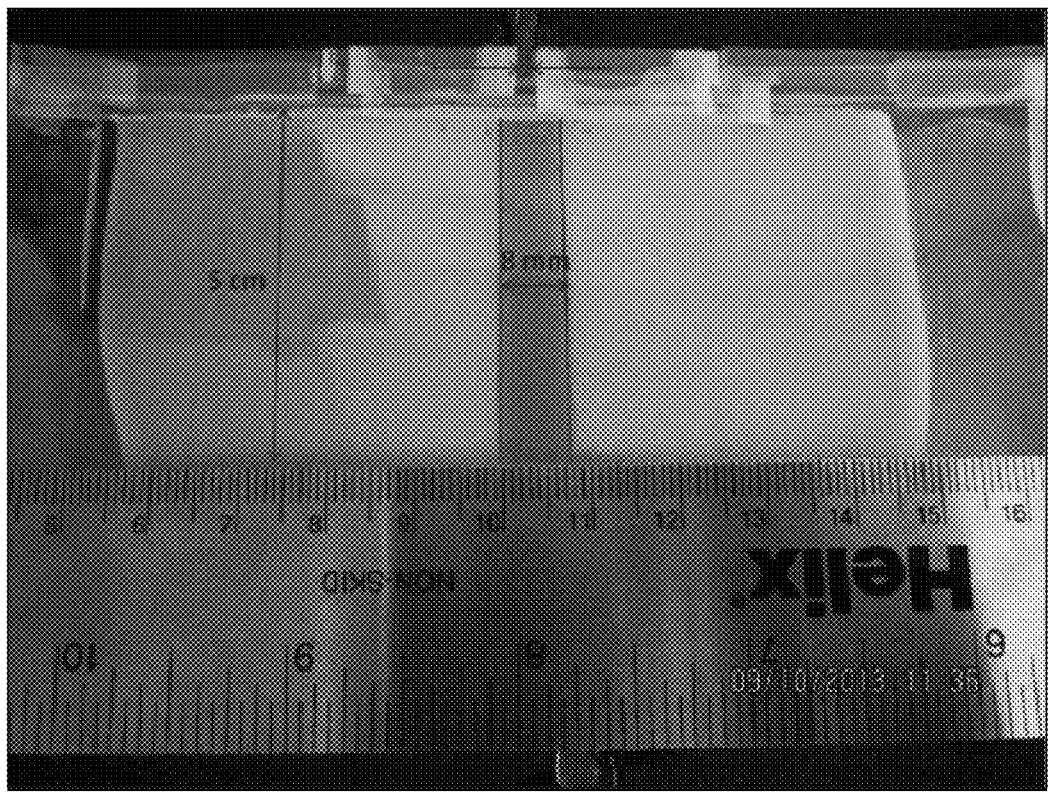
FIG. 3 is an image showing the response of the frequency controlled electro-optical device embodied as a PDLC film, whereby a 5000 Hz, 60V AC (alternating current) control signal or field that is applied using a 2 mm contact electrode attached to the cracked control sections (i.e. ITO film) on the PET substrate. In this case, a width of the switched area of the PDLC film is 8 mm. Crack Length=5 cm; Applied Control Signal Voltage=5000 Hz, 60V; and copper electrode width=2 mm. In accordance with the concepts of the present invention.
Figure 4:
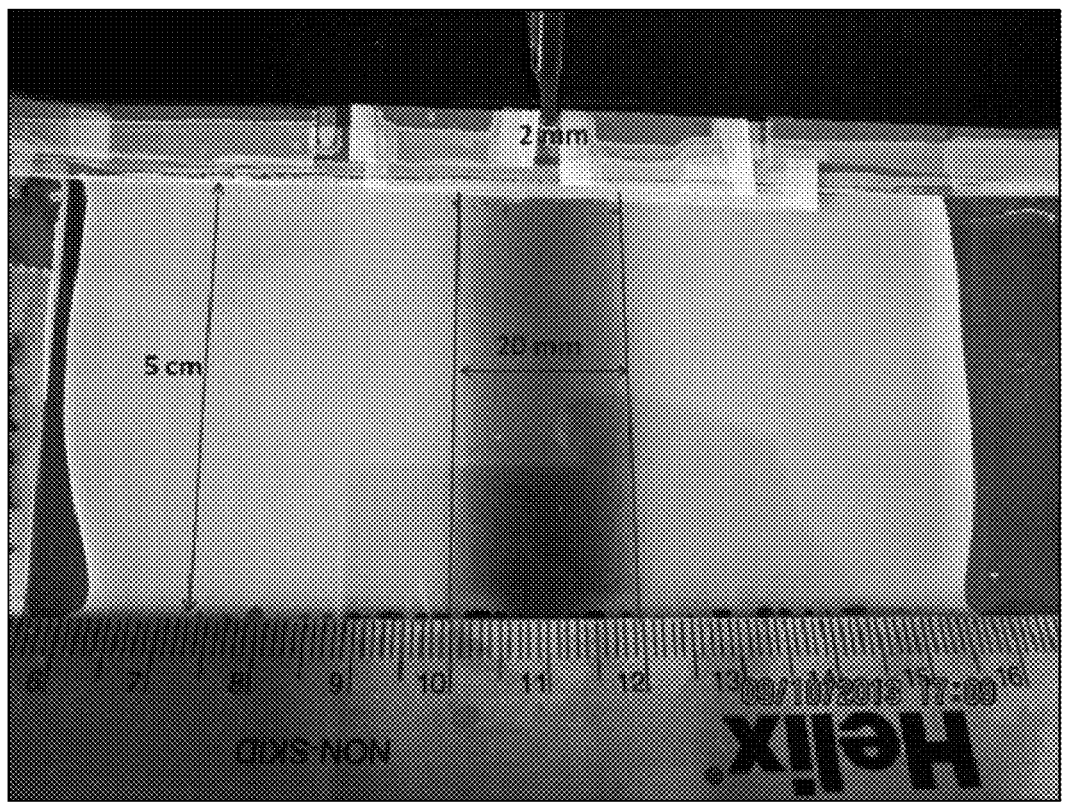
FIG. 4 is an image showing how lowering the frequency of the control signal or field applied to the device results in more adjacent control sections being charged by the applied field. In this example, a 500 Hz, 60V AC control field is applied to the 2 mm electrode. As such, a wider region, 20 mm, of the PDLC film is switched by this lower frequency AC field. Crack Length=5 cm; Applied Control Signal Voltage=500 Hz, 60V; copper electrode width=2 mm. In accordance with the concepts of the present invention.
Figure 5:
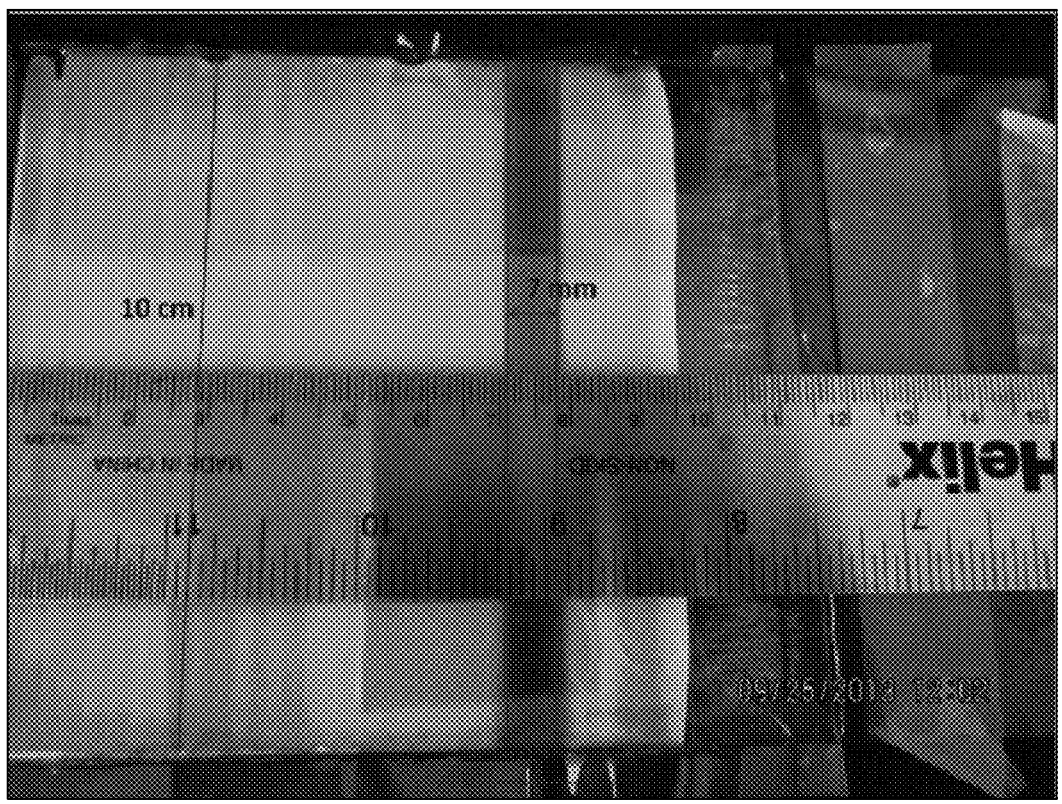
FIG. 5 is an image showing how the length of the cracked PDLC film of the device affects the charging of adjacent control sections by an applied AC field. In this case, the length of the cracked control section has been increased from the 5 cm shown in the images to 10 cm. With the same 5000 Hz, 60V A.C. control field applied, the crack width is reduced from 8 mm to 7 mm. Crack Length=10 cm; Applied Control Signal Voltage=5000 Hz, 60V; copper electrode width=2 mm. In accordance with the concepts of the present invention.
Figure 6:
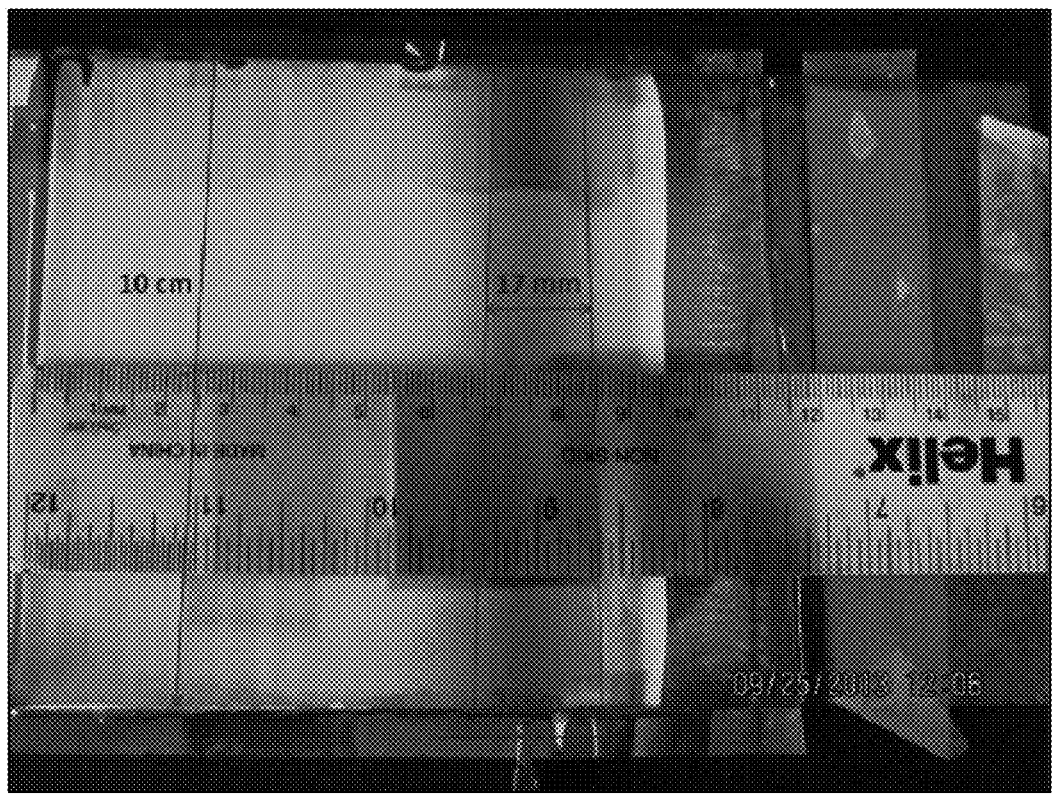
FIG. 6 is an image showing that when a lower frequency 500 Hz, 60V A.C. control field is applied to a device having a crack length of 10 cm, the region of the electro-optical responsive material (PDLC) being switched is reduced to 17 mm. Crack Length=10 cm; Applied Control Signal Voltage=500 Hz, 60V; copper electrode width=2 mm. In accordance with the concepts of the present invention.
Figure 7:
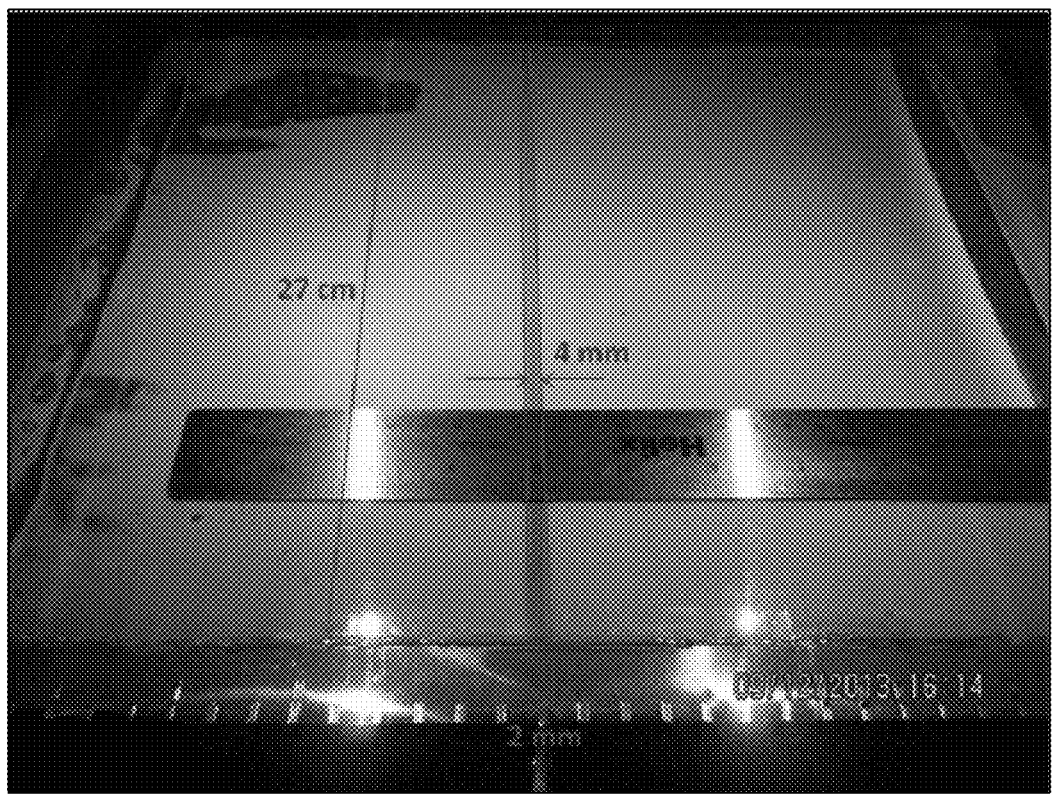
FIG. 7 is an image showing how increasing the crack length of the control sections of the device further to 27 cm reduces the width of the switched PDLC film. Crack Length=27 cm; Applied Control Signal Voltage=5000 Hz, 60V; copper electrode width=2 mm. In accordance with the concepts of the present invention.
Figure 8:
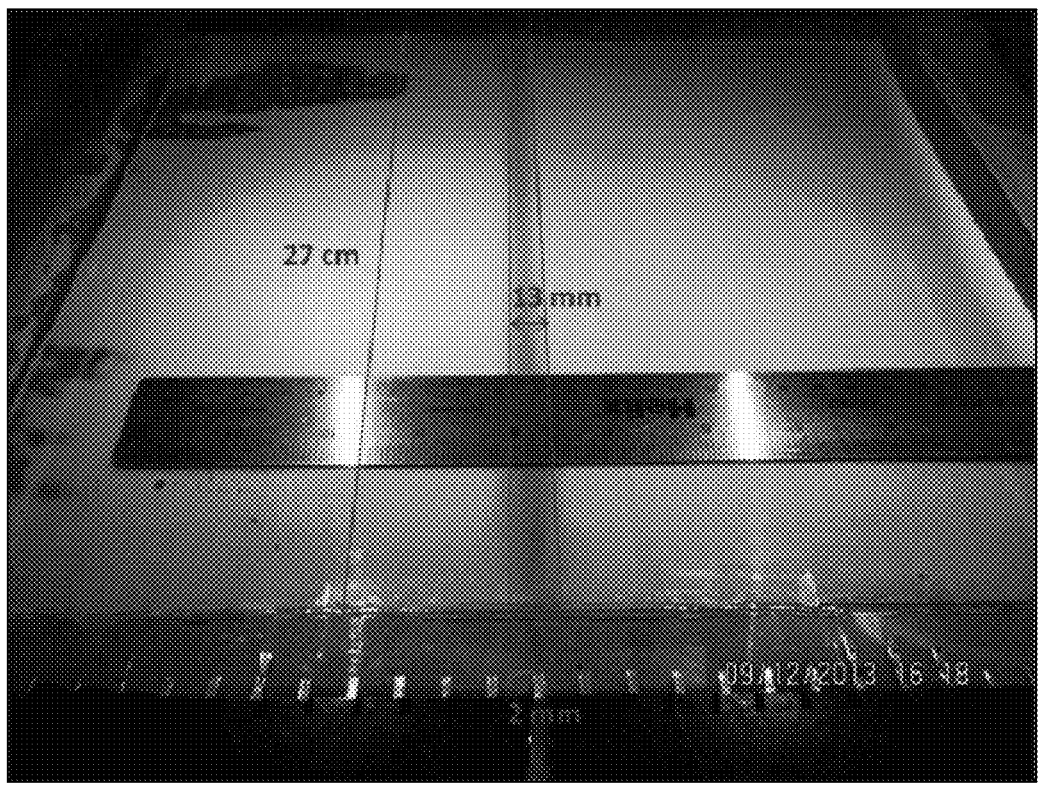
FIG. 8 is an image showing the crack Length=27 cm of the control sections of the device; Applied Control Signal Voltage=500 Hz, 60V; copper electrode width=2 mm of the PDLC film in accordance with the concepts of the present invention.
Figure 9:
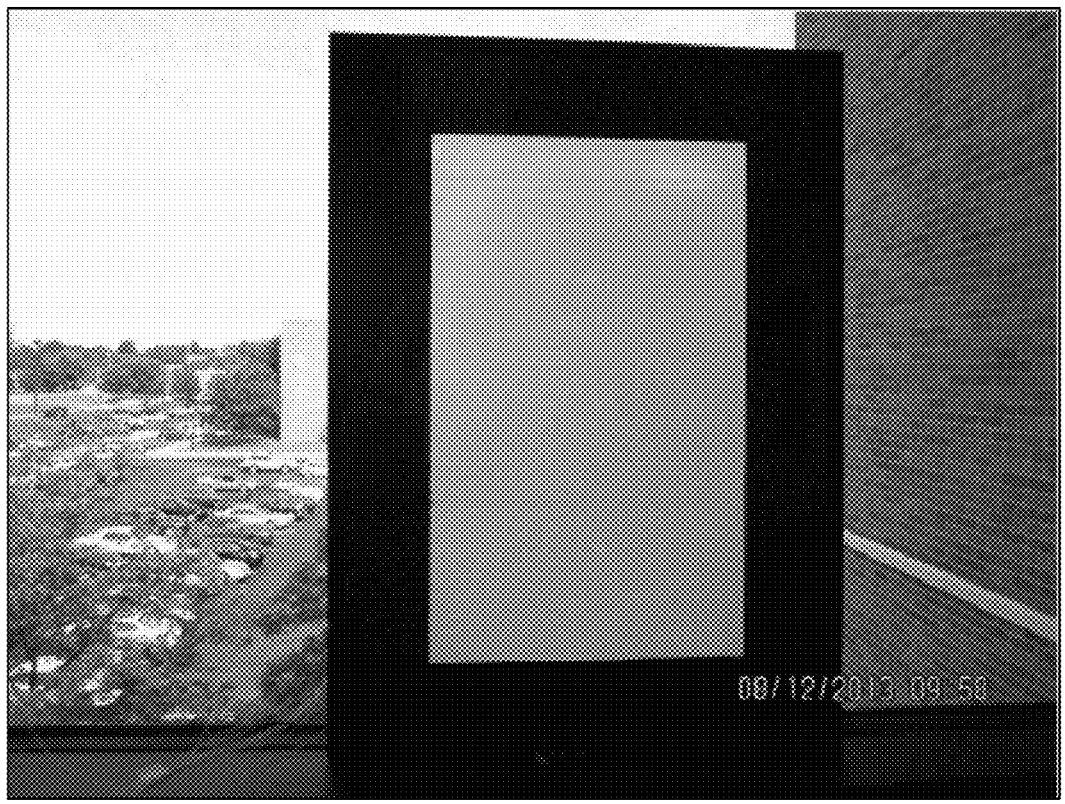
FIG. 9 is an image showing the PDLC film of the device having an Applied Control Signal Voltage=0 volts in accordance with the concepts of the present invention.
Figure 10:
FIG. 10 is an image showing the PDLC of the device with a low, 50 HZ, 60V A.C. control field applied thereto, and the addressed control sections overlapping and the window clear. The applied voltage=60 volts, 50 Hz in accordance with the concepts of the present invention.
Figure 11:
FIG. 11 is an image showing how increasing the applied frequency of the control signal to 2000 Hz results in a narrower region of control sections of the device being addressed. In this case, the addressing electrodes are located at the edge of the cracked ITO film and in the middle of the switched (clear) region. The applied Control Signal Voltage=60 volts, 2000 Hz. In accordance with the concepts of the present invention.
Figure 12:
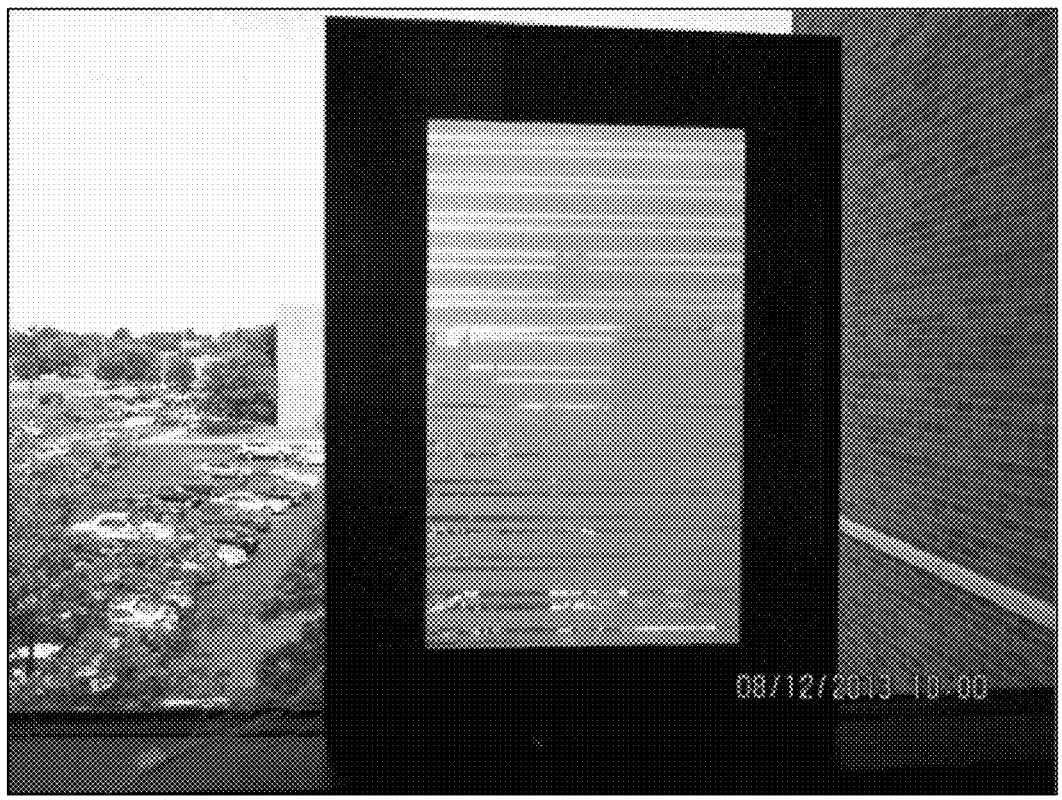
FIG. 12 is an image showing how increasing the AC field of the control signal further reduces the width of the region of the electro-optical responsive layer that is switched by the control sections. The applied control signal voltage=60 volts, 5000 Hz. In accordance with the concepts of the present invention.

It should be appreciated that a plurality of direct control sections 40A may be grouped together consecutively, as shown in FIG. 2. In addition, the direct control sections 40A may be separated from another direct control section 40A by any number of intervening indirect control sections 40B. Furthermore, the indirect control sections 40B may be grouped together in any desired number.

It should be appreciated that in some embodiments, the conductive layer 30 may be formed separately and then applied to the substrate 20 using any suitable technique.

In addition to the patterned conductive sections 40, the electro-optical device 10 also includes a substrate 50, which is spaced from the substrate 20, as shown in FIG. 2. It should be appreciated that the substrate 50 may be equivalent to that of substrate 20, as previously discussed. Disposed adjacent to the substrate 50 is a conductive coating or layer 52, which may comprise any suitable suitable at least partially light transparent material that is also electrically conductive, including ITO (indium-tin-oxide) for example. It should also be appreciated that in some embodiments, the conductive layer 52 may be separated from the substrate 50 by any suitable intervening layer. The conductive layer 52 disposed adjacent to the substrate 50 may be configured so that it is a single, continuous section that extends across the entire substrate 50 or portion thereof. Alternatively, the conductive layer 52 may be formed or patterned into a plurality of individual sections 54 that are separated by dielectric sections or lines 56, which are formed using conventional photolithographic, or similar techniques; as well as formed using the "cracking" process used to form the lines 42 associated with the first substrate 20. In other words, the conductive layer 30 proximate to the substrate 20 is configured to include "cracked" ITO stripes or sections 40, while the conductive layer 52 proximate to the substrate 50 may be formed as a single continuous conductive and transparent layer (i.e. ITO) or may be patterned to include a plurality of individual conductive and transparent sections 54, similar to that of sections 40 previously discussed, and which may formed in any desired manner, such as by a "cracking" process, a photolithographic etching process, or the like.

In addition, the device 10 includes an electro-optical responsive layer 60, which is defined herein as a layer of material, or composite thereof, that is capable of selectively changing optical states, for example between opaque and transparent states and any state therebetween, upon the application of an electrical field thereto. The electro-optical responsive layer 60 is disposed between the conductive layers 30 and 52. In some embodiments, the electro-optical responsive layer 60 may be disposed in the device 10, so as to be adjacent or directly adjacent to the conductive layers 30 and 52. However, in other embodiments, the electro-optical responsive layer 60 may be separated from the conductive layers 30 and 52 by any other suitably intervening layer. The electro-optical responsive layer 60 may be formed of any suitable electro-optical responsive material, including but not limited to liquid crystal material, nematic liquid crystal material, cholesteric liquid crystal material, polymer dispersed liquid crystal (PDLC) material, suspended particles, electrochromic inks (e.g. e-ink) and the like. It should be appreciated that in some embodiments, the electro-responsive layer 60 may comprise a touch sense layer.

As previously discussed, the electro-optical device 10 may include two patterned conductive layers 30 and 52 that are disposed on two separate, spaced substrates, such as respective substrates 20, 50. For example, the patterned conductive material may comprise "cracked" ITO control sections 40 that are disposed on the flexible substrate 20. Disposed between the conductive layers 30 and 52 is a display material or touch sense material, such as cholesteric liquid crystal or an insulator for example. To control the operation of the device 10, the driving circuit 200 is configured so that it is directly connected to only a portion or subset of the total number of ITO sections 40 that are provided by the device 10. That is the device 10 includes conductive control sections 40, in which one portion (i.e. direct control section 40A) is directly coupled to the driving circuit 200 while another portion (i.e. indirect control section 40B) is not coupled to the driving circuit 200. During operation, the driving circuit 200 applies an AC (alternating current) voltage control signal of one or more frequencies to each direct control section 40A to which it is directly coupled. As a result, of the application the AC voltage control signal, an image or touch sense areas is generated, the size of which is controlled by the frequency of the applied AC voltage control signal. Thus, the frequency-controlled liquid crystal device 10 is formed by patterning the conductive ITO material or film disposed on the substrate by a "cracking" process or other suitable technique into a plurality of conductive sections 40, such as that formed of ITO, which are each separated from one another by dielectric lines, which allows neighboring, adjacent conductive sections 40 to be both electrically isolated, and electrically connected depending on the frequency of the control signal used. In addition, the frequency-controlled device utilizes a minimum number of electrodes, whereby the total number of signal applying electrodes that directly couple the driving circuit 200 to the control sections 40 is less than the total number of conductive control sections 40 that are available in the device 10.

To control the operation of the device 10, a driving circuit 200 is utilized, which is coupled to the device 10 by one or more electrodes 210, which are in operative electrical communication with a portion or subset of the total number of patterned sections 40 of the conductive layer 30 and to the conductive layer 52. It should be appreciated that the electrodes 210 are both conductive and at least partially light transparent. In some embodiments, the electrodes 210 are directly attached to the sections 40 or may be indirectly coupled thereto using any suitable means, including through thin film transistors and the like. In other embodiments, a single electrode 210 may be coupled to only a single control section 40, or alternatively a single electrode 40 may be coupled to a plurality of control sections 40, as shown in FIG. 2. In some embodiments, the control sections 40 and the electrodes 210 may be integrated together as a single unitary structure, allowing the control circuit 210 to be directly coupled to the control sections 40. It should be appreciated that the driving circuit 200 includes the necessary hardware, software or combination thereof, to enable the various functions of the device 10 discussed herein. As such, only the particular conductive sections, referred to as direct control sections 40A, which are directly connected to the driving system 200 by way of the electrodes 210 are enabled to directly receive a control signal from the driving circuit 200. In addition, the other sections 40 that are not directly coupled to the driving circuit, referred to as indirect control sections 40B, which do not receive a control signal and are left electrically floating. It should be appreciated that the control signal generated by the driving circuit 200 may comprise an AC (alternating) signal, such as an AC voltage signal. It should be appreciated that the driving circuit 200 may generate multiple control signals of the same or different frequency for application to multiple respective control sections 40A.

It should be appreciated that in some embodiments, the width of the electrode 210 may be greater than or less than the width of a single control section 40. As such, one electrode 210 may be coupled to one control section 40 or one electrode 210 may be coupled to multiple control sections 40, as desired.

In other embodiments of the device 10, the substrate 50 and/or the conductive layer 52 may be removed and not used, and as such, the control circuit 200 is coupled to only electrodes 210 that is in direct control of the direct control sections 40A provided by the conductive layer 30, as shown in FIG. 2. It should also be appreciated that the control sections 40 to which the control circuit 200 is directly coupled thereto may be separated by one or more electrodes 210 that are not coupled to the driving circuit 200. Such a configuration of the device 10 forms an in-plane electric field that is used to control the optical state of the electro-optical responsive layer 60.

During operation, the driving circuit 200 applies the AC (alternating current) control signal to the electrodes 210 to directly energize the conductive sections 40 coupled thereto, which are referred to herein as direct control sections 40A, so as to generate an electric field therein. As a result of the application of the electric field in the direct control sections 40A, the optical state (i.e. transparent/opaque) in the electro-optical responsive layer 60 that is adjacent or otherwise exposed to the electric field emitted from the energized direct control sections 40A is controlled and selectively changed based on the presence/non-presence, intensity, and/or frequency of the control signal. In addition, to the electric field emitted by the direct control sections 40A, additional electric fields emitted from one or more other indirect control sections 40B that are positioned adjacent or otherwise near or proximate to one of the direct control sections 40A. That is, the indirect control sections 40B, also provide an electric field that is induced from the direct control section 40A to which the indirect control section 40B is adjacent or proximately positioned or associated. However, it should be appreciated that the number of the indirect control sections 40B that are made active to deliver an electric field to the electro-optical responsive layer 60 is based or determined on the frequency of the AC control signal that is delivered to the direct control section 40A and that forms the electric field in the direct and indirect control sections 40A-B. The profile of the electric field by the control sections 40A-B may be continuously adjusted by varying the frequency of the applied control signal. In other words, adjusting the frequency of the control signal that is delivered to the direct control sections 40A, serves to adjust the number of indirect control sections 40B that supply an electric field sufficient to control the optical state of the electro-optical responsive layer 60. Accordingly, the size of the area in the electro-optical responsive layer 60 in which the optical state is controlled is determined based on the frequency of the directly applied AC control signal. As such, the electric field applied by the control sections 40A-B has the effect of controlling the optical state of the electro-optical responsive layer 60, between a substantially opaque state to an at least partially transparent state, and vice versa, and all optical states therebetween.

In other words, because the conductive sections 40 that are patterned from the "cracking" process are still in electrical communication with each other, the direct control sections 40A is able to provide an electric field from the AC control signal that it directly receives, but is also capable of inducing an electric field in adjacent indirect control sections 40B that are not in direct receipt of a control signal. Thus, the optical state of an area of the electro-optical responsive layer 60 can be controlled not only in the area proximate to the direct control section 40A, but also in areas of the electro-optical responsive layer 60 that are proximate to the indirect control sections 40B. That is, the driving circuit 200 utilized by the device 10 is not required to be coupled to every conductive section 40 in order to provide control over the optical state of the device 10. In fact, only a fraction or portion of the total number of the conductive sections 40 are directly coupled to the driving circuit 200. Because of this design, the number of electrodes is minimized, the driving circuit 200 is able to be simplified significantly, thereby allowing the cost of the device 10 to be substantially reduced.

It should be appreciated that the cracked control sections 40 also provide a simple and elegant means of producing an electric field profile having an intensity (voltage magnitude) that diminishes continually as the number of control sections 40 or distance separating floating indirect control sections 40B from a direct control section 40A increases. The rate at which this electric field profile diminishes as a function of the distance from the direct control section 40A is varied by adjusting the frequency of the applied AC control signal or field. This precise tuning of the electric field profile can also be used in various other applications, including but not limited to beam steering and tunable lens applications.

Experimental Results

The frequency-dependent line image of the device 10 embodied as a PDLC is formed by sandwiching a PDLC electro-optic responsive film between two PET substrates that are each coated with a transparent ITO film on their inner surfaces. The ITO on one of the PET substrates is cracked by a process discussed in International Application No. PCT/US14/72751, entitled "Method of Patterning Electrically-Conductive Film on a Flexible Substrate", which is incorporated herein by reference; and U.S. application Ser. No. 13/721,312, entitled "Method of Patterning Electrically-Conductive Film on Flexible Substrates", which is also incorporated herein by reference. The second substrate includes of a continuous plane ITO layer on a PET substrate. A single electrical contact is coupled to the continuous plane ITO layer on the PET substrate and a second electrical contact, which is about 2 mm in width, is coupled to the cracked ITO on PET substrate. The response of the PDLC film is measured as a function of the frequency of an applied AC (alternating current) field/signal of 60V magnitude. Upon application of an AC field of sufficient magnitude, the PDLC film switches from a scattering state to a clear state. The white regions of the PDLC film, as shown in FIGS. 3-8 are in a light scattering state (i.e. un-switched state), while the darker region that is centered on the contact electrode has a sufficient A.C. field applied thereto to be switched into a light transmitting state (i.e. clear state).

TABLE 1

Summary of the frequency-dependent line width in the PDLC film made by "cracked" ITO stripes or sections on a PET substrate of the device 10 in accordance with the concepts of the present invention.

|  | Line Image Width (mm) of 5 cm Cracks | Line Image Width (mm) of 10 cm Cracks | Line Image Width (mm) of 27 cm Cracks |
| --- | --- | --- | --- |
| 50 Hz | 35~40 (fuzzy edge) | 32~38 (fuzzy edge) | 25~30 (fuzzy edge) |
| 100 Hz | 30~35 (fuzzy edge) | 26~32 (fuzzy edge) | 20~25 (fuzzy edge) |
| 500 Hz | 20 | 17 | 13 |
| 1000 Hz | 15 | 13 | 10 |
| 2000 Hz | 12 | 11 | 8 |
| 3000 Hz | 10 | 9 | 6 |
| 5000 Hz | 8 | 7 | 4 |

The frequency dependence of the width of the switched or controlled region/area of a PDLC film can be used in a variety of applications, such as to produce a highly functional window, with a minimal number of electrodes, for example. The maximum number of regions that can be individually switched is determined by the number of electrical contacts used, while the width of the switched regions is controlled by the frequency of the applied AC field. In particular, this window application, shown in the photo below, produces an electronic blind effect that can be visually raised and lowered with the width of the addressed region determined by the applied frequency. The frequency-controlled window blinds on which the display area is 26 cm×42 cm. The operation of this PDLC window is shown in FIGS. 9-12.

This PDLC film utilizes nematic liquid crystals dispersed as droplets in a polymer binder. As such, the PDLC film provides a simple demonstration of the response of liquid crystal material to the electric field profile produced by the control sections 40, and how this electric field profile is adjusted by adjusting the frequency of the applied AC control signal or field. A pure nematic or chiral nematic liquid crystal will respond in a similar fashion. It is to be understood that the PDLC film used in the example presented herein provides a visual image of the profile of the applied electric field and a clear demonstration of how this profile changes with the applied AC control signal or field from the control circuit 200.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:
1. An electro-optical device comprising:
   a plurality of control sections formed of electrically conductive, at least partially light transparent material, wherein a crack line defines a boundary between said control sections that are adjacent to each other, wherein one or more of said plurality of control sections comprises a direct control section adapted to directly receive a control signal that generates an electric field therefrom, and one or more of said plurality of control sections adjacent to said direct control section comprises an indirect control section; and an electro-optical responsive layer;

wherein the electric field associated with said one or more direct control sections is induced in a number of said indirect control sections that is determined by a frequency of said control signal, such that an optical state of an area of said electro-optical responsive layer that is exposed to the electric fields associated with said one or more direct control sections and said number of indirect control sections is controlled.

2. The electro-optical device of claim 1, wherein said plurality of control sections comprise indium-tin-oxide (ITO).

3. The electro-optical device of claim 1, wherein said electro-optical responsive layer is formed of a material selected from the group consisting of polymer dispersed liquid crystal (PDLC) material, nematic liquid crystal material, and cholesteric liquid crystal material.

4. The electro-optical device of claim 1, wherein said electro-optical responsive layer comprises suspended particles.

5. The electro-optical device of claim 1, wherein said electro-optical responsive layer comprises electrochromic ink.

6. The electro-optical device of claim 1, further comprising an electrode coupled to each said direct control section, such that the control signal is applied to said electrode.

7. The electro-optical device of claim 1, further comprising an electrode coupled to a plurality of said direct control sections.

8. The electro-optical device of claim 1, wherein the control signal comprises an A.C. (alternating current) signal.

9. The electro-optical device of claim 1, further comprising a flexible substrate positioned adjacent to said plurality of control sections.

10. The electro-optical device of claim 9, wherein said flexible substrate comprises polyethylene terephthalate (PET).

11. The electro-optical device of claim 1, further comprising a control layer formed of electrically conductive, at least partially light transparent material, said control layer disposed adjacent to said electro-optical responsive layer and substantially opposite to said plurality of control sections, wherein the control signal is applied to said control layer to control the optical state of said area of said electro-optical responsive layer.

12. The electro-optical device of claim 11, wherein said control layer comprises a single continuous section of material.

13. The electro-optical device of claim 11, wherein said control layer comprises a plurality of control sections, wherein each one of said plurality of control sections is partially electrically isolated from another control section by a pair of adjacent crack lines.

14. The electro-optical device of claim 11, further comprising a substrate positioned adjacent to said control layer.

15. A method of controlling an electro-optical device comprising:

providing an electro-optical device having a plurality of control sections formed of electrically conductive, at least partially light transparent material, wherein a crack line defines a boundary between said control sections that are adjacent to each other, wherein one of said plurality of control sections comprises a direct control section adapted to directly receive a control signal, and one or more of said plurality of control sections adjacent to said direct control section comprises an indirect control section;

applying said control signal to said direct control section;

generating an electric field at said direct control section;

adjusting a frequency of said control signal to control a number of indirect control sections in which said electric field is induced therein;

controlling an optical state of an area of an electro-responsive material that is exposed to said electric field.

16. The method of claim 15, further comprising:

adjusting a frequency of said applied control signal;

modifying said electric field; and changing the size of said area in which said optical state is controlled.

17. The method of claim 16, wherein said control signal has a frequency of about 500 Hz.

18. The method of claim 15, wherein said plurality of control sections comprise indium-tin-oxide (ITO).

19. The method of claim 15, wherein said electro-optical responsive layer is formed of a material selected from the group consisting of polymer dispersed liquid crystal (PDLC) material, nematic liquid crystal material, and cholesteric liquid crystal material.

20. The electro-optical device of claim 15, wherein said electro-optical responsive layer comprises suspended particles.

21. The electro-optical device of claim 15, wherein said electro-optical responsive layer comprises electrochromic ink.

22. The electro-optical device of claim 15, wherein said electro-optical device includes an electrode coupled to said direct control section.

23. The electro-optical device of claim 22, wherein said electrode is coupled to a plurality of said direct control sections.

24. An electro-optical device comprising:

a plurality of control sections formed of electrically conductive, at least partially light transparent material, wherein a crack line defines a boundary between said control sections that are adjacent to each other, wherein one of said plurality of control sections comprises a direct control section adapted to directly receive a control signal that generates a first electric field therefrom, and one or more of said plurality of control sections adjacent to said direct control section comprises an indirect control section; and an electro-optical responsive layer;

wherein said first electric field induces a second electric field in a number of said one or more direct control sections, said number being determined by a frequency of said control signal, such that an optical state of an area of said electro-optical responsive layer that is exposed to said first and second electric fields is controlled.

* * * * *